United States Patent
Alwan et al.

(10) Patent No.: US 11,831,088 B1
(45) Date of Patent: Nov. 28, 2023

(54) DUAL-BAND ANTENNA SYSTEMS

(71) Applicants: Elias Alwan, Miami, FL (US); Md Nazim Uddin, Miami, FL (US)

(72) Inventors: Elias Alwan, Miami, FL (US); Md Nazim Uddin, Miami, FL (US)

(73) Assignee: THE FLORIDA INTERNATIONAL UNIVERSITY BOARD OF TRUSTEES, Miami, FL (US)

( * ) Notice: Subject to any disclaimer, the term of this patent is extended or adjusted under 35 U.S.C. 154(b) by 0 days.

(21) Appl. No.: 18/355,039

(22) Filed: Jul. 19, 2023

(51) Int. Cl.
*H01Q 9/04* (2006.01)
*H01Q 1/28* (2006.01)
*B64G 1/10* (2006.01)
*H01Q 21/00* (2006.01)
*B64G 1/66* (2006.01)
*H01Q 5/35* (2015.01)

(52) U.S. Cl.
CPC .......... *H01Q 9/0435* (2013.01); *B64G 1/10* (2013.01); *B64G 1/66* (2013.01); *H01Q 1/288* (2013.01); *H01Q 5/35* (2015.01); *H01Q 21/0075* (2013.01)

(58) Field of Classification Search
CPC ........ H01Q 9/0435; H01Q 1/288; H01Q 5/35; H01Q 21/0075
See application file for complete search history.

(56) References Cited

U.S. PATENT DOCUMENTS 10,368,251 B1 * 7/2019 Olds .............. H04W 16/28

FOREIGN PATENT DOCUMENTS

| CN | 104332713 A | * | 2/2015 |
| CN | 112290228 A | * | 1/2021 |
| CN | 114614257 A | * | 6/2022 |
| EP | 0434268 A2 | * | 6/1991 |

* cited by examiner

*Primary Examiner* — Dieu Hien T Duong
(74) *Attorney, Agent, or Firm* — Saliwanchik, Lloyd & Eisenschenk

(57) ABSTRACT

Dual-band antenna systems and methods of fabricating and using the same are provided. A tunable dual-polarization (left-hand circular polarized (LHCP) and right-hand circular polarized (RHCP)) antenna can be used both for L-band (1.215 gigahertz (GHz)-1.85 GHz) and Ka-band (32.3 GHz-34.2 GHz) operation. The antenna system can be an embedded antenna system, which can be used for 3U CubeSats, with full polarization diversity able to operate in two widely spaced frequency bands (L-band and Ka-band) of the spectrum. The antenna system can include three layers, including a top substrate, a bottom substrate, and a ground plane disposed between the top substrate and the bottom substrate.

17 Claims, 13 Drawing Sheets

LHCP

Represents the energized state of patch

RHCP

DUAL-BAND ANTENNA SYSTEMS

GOVERNMENT SUPPORT

This invention was made with government support under 2030250 awarded by the National Science Foundation. The government has certain rights in the invention.

BACKGROUND

The National Aeronautics and Space Administration (NASA) has a strong need for millimeter-wave (mmWave)-band capabilities for deep space missions (including lunar missions and beyond) to enable much higher data rates required for high-definition imaging and other scientific explorations. Ka-band operation has been successfully demonstrated with satellites for deep space missions, but all systems were limited in power and antenna size. For instance, Juno employs a 2.5 meter (m) dual reflector antenna for radio science. While such antenna size can be acceptable for large satellites, it is not suitable for CubeSats or small robotic platforms. In addition, space communication links have so far been limited to very low data rates and employed narrowband single-beam interfaces. According to NASA Jet Propulsion Laboratories (JPL), Mars Reconnaissance Orbiter (MRO) can communicate with Earth at a data rate of up to 5.2 megabits per second (Mbps) using a Ka-band radio. However, with such a rate, a single high-resolution imaging science experiment (HiRISE) requires at least 1.5 hours to relay data to Earth. Also, high-resolution hyperspectral imagers used to study mineral contents produce images that are thousands of times larger. In order to effectively send the massive glut of data generated by such imagers, much larger bandwidths are needed.

BRIEF SUMMARY

Embodiments of the subject invention provide novel and advantageous antennas systems, as well as methods of fabricating and using the same. A tunable dual-polarization (left-hand circular polarized (LHCP) and right-hand circular polarized (RHCP)) antenna system can be used both for L-band (1.215 gigahertz (GHz)-1.85 GHz) and Ka-band (32.3 GHz-34.2 GHz) operation. The antenna system can be an embedded antenna (also known as aperture-in-aperture (AIA)) system, which can be used for 3 U CubeSats, with full polarization diversity able to operate in two widely spaced frequency bands (L-band and Ka-band) of the spectrum. The antenna system can include three layers, each of which can be a metal layer, including a top substrate, a bottom substrate, and a ground plane disposed between the top substrate and the bottom substrate.

In an embodiment, an antenna system can comprise: a top substrate; a bottom substrate; a ground plane disposed between the top substrate and the bottom substrate; a first array of first antenna elements disposed on the top substrate and configured to operate in the L-band; a second array of second antenna elements disposed on the top substrate and configured to operate in the Ka-band; a first feed network disposed on the bottom substrate and electrically connected to the first array; and a second feed network disposed on the bottom substrate and electrically connected to the second array. The first feed network can comprise a plurality of first output feedlines respectively connected (e.g., electrically connected and/or in direct physical contact with) to the first antenna elements, and/or the second feed network can comprise a plurality of second output feedlines respectively connected (e.g., electrically connected and/or in direct physical contact with) to the second antenna elements. The antenna system can further comprise: a plurality of first via pairs respectively connecting (e.g., electrically connecting and/or in direct physical contact with) the first antenna elements and the first output feedlines; and a plurality of second via pairs respectively connecting (e.g., electrically connecting and/or in direct physical contact with) the second antenna elements and the second output feedlines. Each first output feedline can comprise two diodes, and/or each second output feedline can comprise two diodes. The two diodes of each first output feedline can be in direct physical contact (and electrically connected with) with two vias, respectively, of one of the first via pairs, and/or the two diodes of each second output feedline being in direct physical contact with (and electrically connected with) two vias, respectively, of one of the second via pairs. That is, within each output feedline (first and second), one diode can be in direct physical contact with one via, and the other diode can be in direct physical contact with the other via of the via pair, such that the two diodes are electrically connected to an antenna element by the vias. The first feed network can comprise a first feed connection line extending to an edge (e.g., a first portion of an outer perimeter) of the bottom substrate, and/or the second feed network can comprise a second feed connection line extending to an edge (e.g., a second portion of the outer perimeter) of the bottom substrate. The first and second feed connection lines can be configured for connection to a (same or different from each other) power source, such as an external power source. The first array can comprise, for example, eight first antenna elements (e.g., disposed in a 2×4 arrangement). The second array can comprise, for example, sixteen second antenna elements (e.g., disposed in a 1×16 arrangement). Each first antenna element can be a patch antenna element, and/or each second antenna element can be a patch element. Each first antenna element can be a patch antenna element with two opposite corners each being truncated, and/or each second antenna element can be a patch element with two opposite corners each being truncated. Each first antenna element can have an upper surface with an area that is at least 2 times (or at least 3 times, at least 4 times, at least 5 times) larger than an area of an upper surface of each second antenna element. The first feed network can be a microstrip transmission line-based network, and/or the second feed network can be a microstrip transmission line-based network. Each first antenna element can be configured to operate as both LHCP and RHCP (e.g., by virtue of ON/OFF or energized/de-energized states of the two diodes of the corresponding output feedline), and/or each second antenna element can be configured to operate as both LHCP and RHCP (e.g., by virtue of ON/OFF or energized/de-energized states of the two diodes of the corresponding output feedline). The antenna system can be configured to operate the first antenna array and the second antenna array simultaneously, providing dual band operation.

In another embodiment, a 3 U CubeSat can comprise: a base; and an antenna system as described herein. The antenna system can have any or all of the features discussed in the previous paragraph. The antenna system and the base can each have a length of 30 centimeters (cm) (or about 30 cm) and a width of 10 cm (or about 10 cm). The 3 U CubeSat can have a height of 10 cm (or about 10 cm).

BRIEF DESCRIPTION OF DRAWINGS

FIG. 8 shows a plot of $S_{11}$ (in decibels (dB)) versus frequency (in gigahertz (GHz)), showing the simulated return loss of an L-band antenna. The curve with the higher $S_{11}$ values is for the LHCP configuration (D1 on); and the curve with the lower $S_{11}$ values is for the RHCP configuration (D2 on). The inset shows a representation of the two states, one with D1 on and one with D2 on.

FIG. 9 shows a plot of $S_{11}$ (in dB) versus frequency (in GHz), showing the simulated return loss of a Ka-band antenna. The curve with the higher $S_{11}$ values is for the RHCP configuration (D2 on); and the curve with the lower $S_{11}$ values is for the LHCP configuration (D1 on). The inset shows a representation of the two states, one with D1 on and one with D2 on.

FIG. 10 shows a plot of axial ratio (in dB) versus frequency (in GHz), showing the simulated axial ratio of an L-band antenna. The curve with the higher axial ratio values is for the RHCP configuration (D2 on); and the curve with the lower axial ratio values is for the LHCP configuration (D1 on). The inset shows a representation of the two states, one with D1 on and one with D2 on.

FIG. 11 shows a plot of axial ratio (in dB) versus frequency (in GHz), showing the simulated axial ratio of a Ka-band antenna. The curve with the higher axial ratio value at a frequency of 32 GHz is for the RHCP configuration (D2 on); and the curve with the lower axial ratio value at a frequency of 32 GHz is for the LHCP configuration (D1 on). The inset shows a representation of the two states, one with D1 on and one with D2 on.

DETAILED DESCRIPTION

Figure 1:
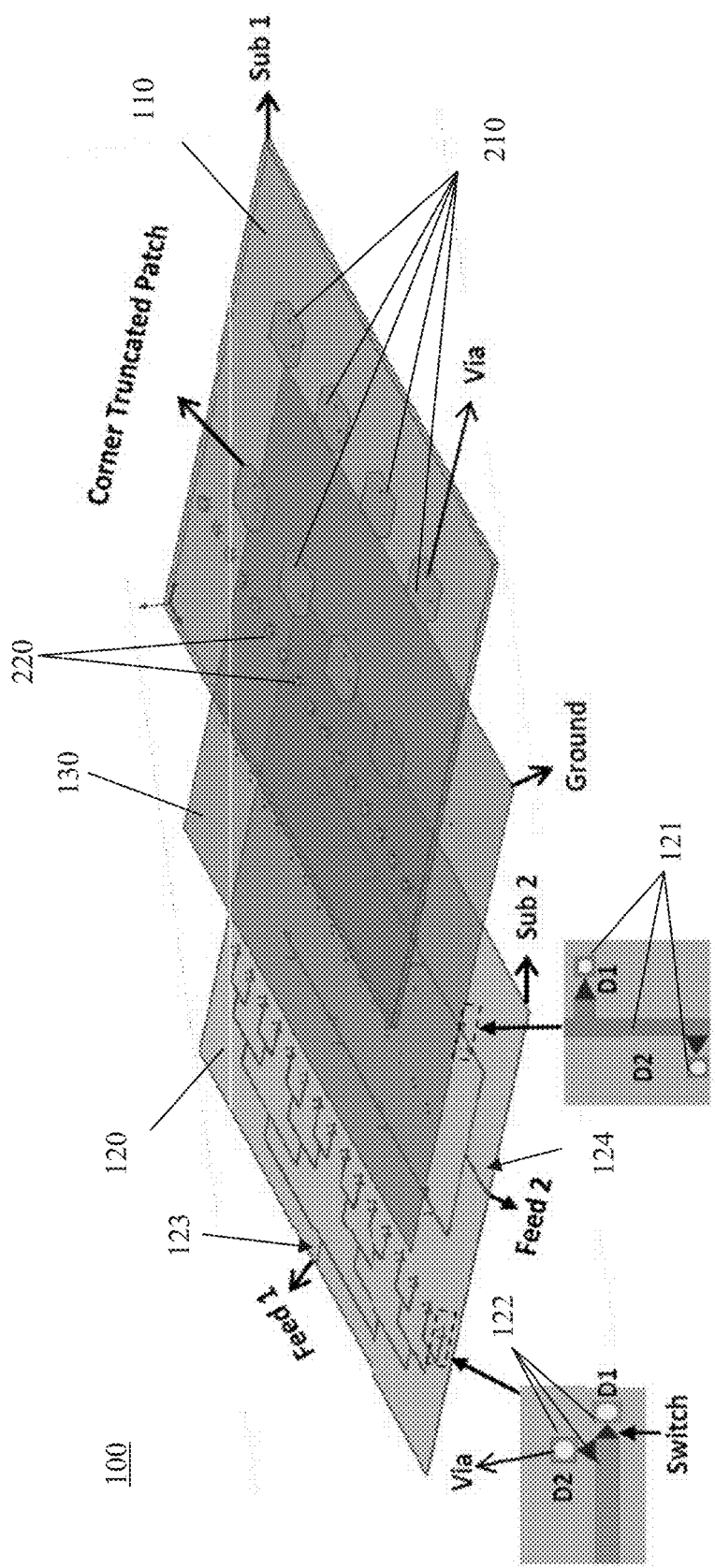
FIG. 1 shows a three-dimensional (3 D) exploded view of an antenna array, according to an embodiment of the subject invention.

Embodiments of the subject invention provide novel and advantageous antenna systems and antenna arrays, as well as methods of fabricating and using the same. A tunable dual-polarization (left-hand circular polarized (LHCP) and right-hand circular polarized (RHCP)) antenna system can be used both for L-band (1.215 gigahertz (GHz)-1.85 GHz) and Ka-band (32.3 GHz-34.2 GHz) operation. The antenna system can be an embedded antenna (also known as aperture-in-aperture (AIA)) system, which can be used for 3 U CubeSats, with full polarization diversity able to operate in two widely spaced frequency bands (L-band and Ka-band) of the spectrum. The antenna system can include three layers, each of which can be a metal layer. The top layer can be a top substrate having the radiating antenna elements disposed thereon (i.e., the radiating antenna elements for L-band operation and the radiating antenna elements for Ka-band operation). The bottom layer can be a bottom substrate that can have disposed thereon a first feed network for the radiating antenna elements for L-band operation and a second feed network for the radiating antenna elements for Ka-band operation. The first and second feed networks can be orthogonal feed networks. The middle layer can be a ground plane disposed between the top substrate and the bottom substrate.

Compared to related art arrays, dual-band and dual-polarization techniques can eliminate the use of the bulky and lossy circuits. Compared to related art antenna arrays for CubeSat, the design of embodiments of the subject invention enables polarization diversity and frequency reconfigurability by achieving significant enhancement in a realized gain of the antenna. It also enables a reduction in power, cost, and size of front-ends.

The high throughput needed for high-definition imaging and other scientific explorations (e.g., deep space missions) can be realized using ultra-wideband (UWB) or multiband radio frequency (RF) front-ends that can cognitively operate across deep space communication frequency bands, such as L-band, S-band (2.110 GHz-2.300 GHz), X-band (7.145 GHz-8.450 GHz), and Ka-band. In order to do so, radios should continuously observe the spectrum of interest and decide the best transmission frequency and bandwidth to meet interference and data rate requirements. Indeed, adaptability in the signal frequency of operation and power allocation have been of growing interest, particularly in NASA initiatives. Therefore, future space radios should be equipped with smart decision-making software and hardware to intelligently optimize the limited bandwidth resources while keeping reliable communication. This area is central to software radios and radars and is of great interest to NASA. Besides being frequency agile, such radios need to be small in size and weight, and of low power (i.e., low size, weight, and power SWaP)) to accommodate the much smaller future NASA satellites and other spacecraft. Overall, the development of such a technology can enable smart/autonomous exploration, real-time 3 D mapping and in situ data processing, and high-speed data transfer to an orbiter or direct-to-Earth (DTE). This research aligns with the Space Technology Mission Directorate (STMD) that plans to advance communications and navigation for autonomous deep space missions. In order to harness more of the available bandwidth, wideband and UWB antenna technologies can be solutions because of their large bandwidth and high data rate, and UWB antennas are preferred to support multiple bands.

Among different types of UWB antenna configurations, a balanced antipodal Vivaldi antenna (BAVA) or tightly coupled dipole antenna (TCDA) are options for UWB operation. However, while these types of antennas may have a wide frequency range, they greatly suffer from gain-bandwidth-efficiency trade-offs. Additionally, as near and deep space communications is moving up to GHz and terahertz (THz) range frequencies, the path-loss severely increases, which requires massive antenna arrays to compensate for such a loss, at the expense of a significant increase in the payload. Apart from these, UWB systems need a long signal acquisition time in the RF back-end. Meanwhile, the high probability of interference limits the use of these antennas for applications where a small interference is considered a threat and must be avoided. Therefore, in order to appropriately benefit from the mmWave spectrum, multiple antenna elements are needed for the creation of multiple spatial channels, improving the system's data rate. A solution for gain issues is required, other than such UWB systems, while maintaining widespread coverage; embodiments of the subject invention address these problems.

Figure 2:
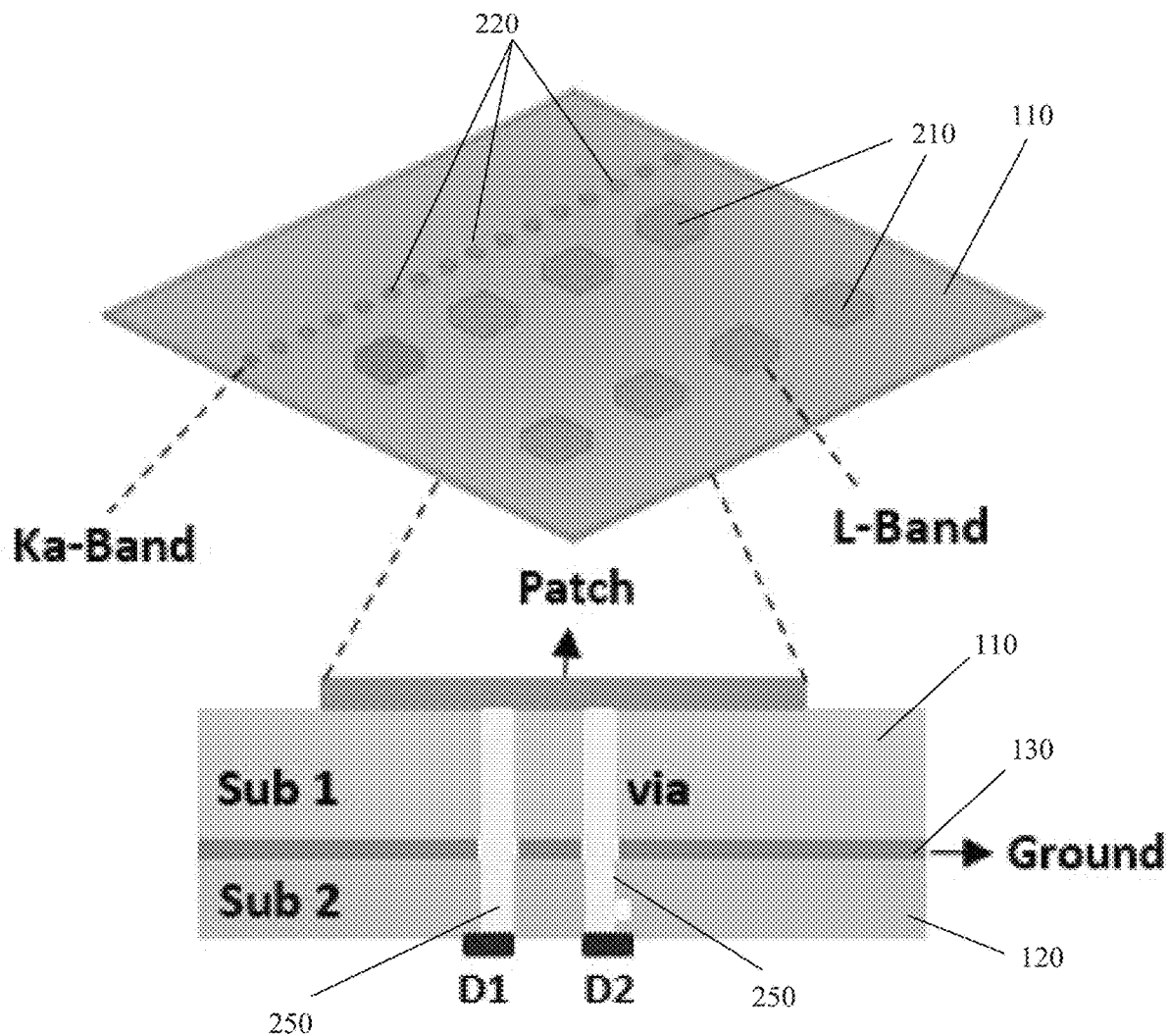
FIG. 2 shows a side view of a first substrate of an antenna array, according to an embodiment of the subject invention.
Figure 3:
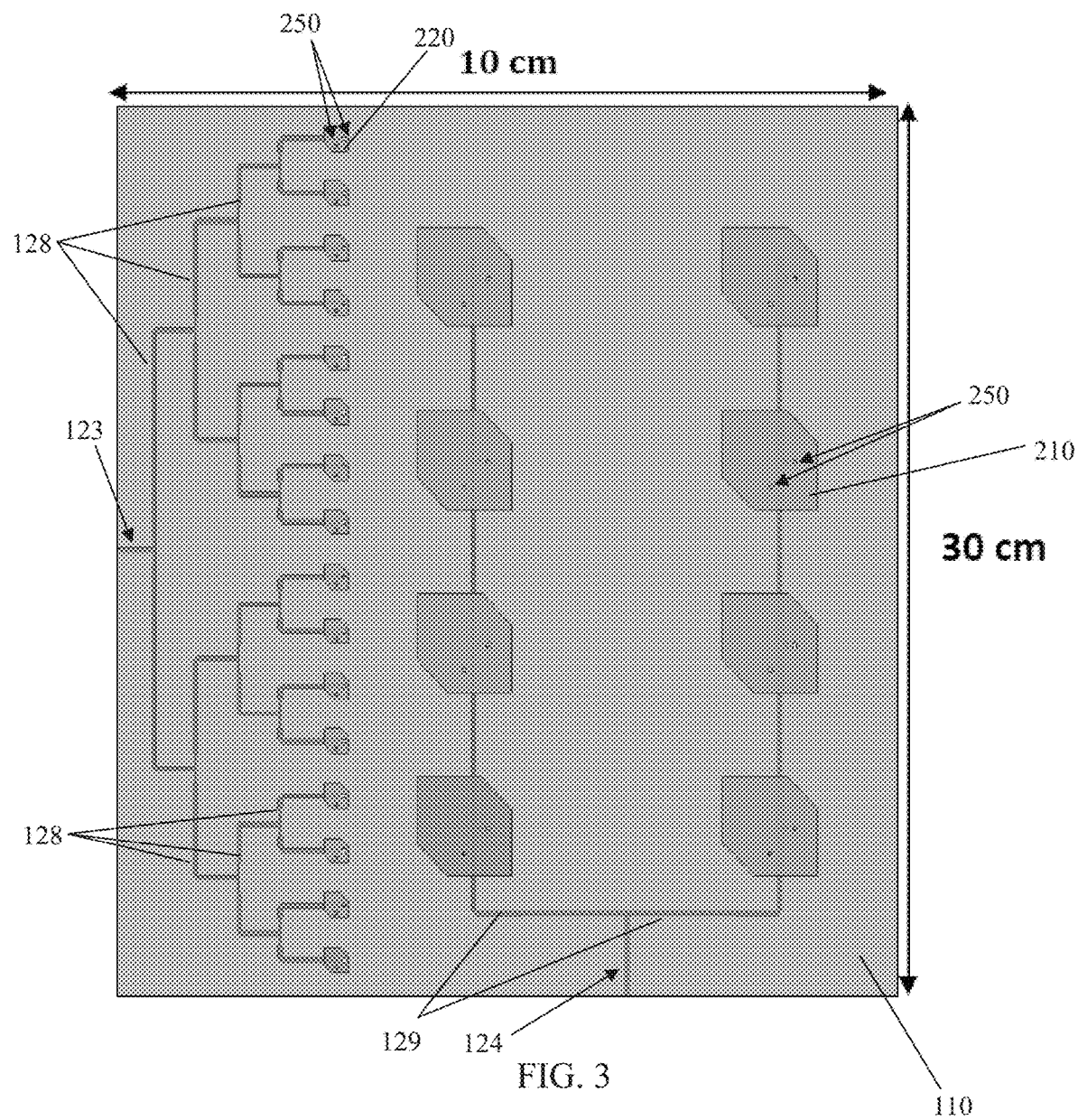
FIG. 3 shows a top view of an antenna array, according to an embodiment of the subject invention. Though FIG. 3 lists certain dimensions, these are for exemplary purposes only and should not be construed as limiting.
Figure 4:
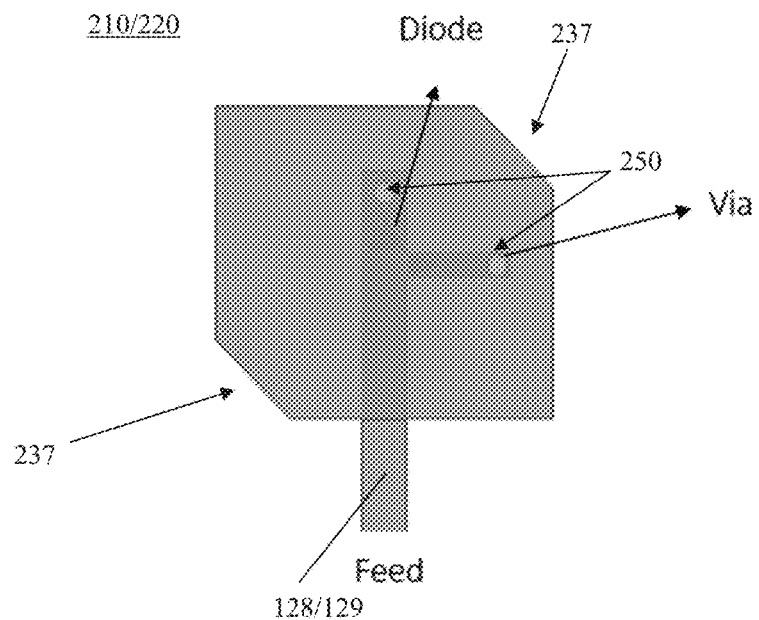
FIG. 4 shows a top view of a dual band unit antenna, according to an embodiment of the subject invention. That is, the dual band unit antenna in FIG. 4 can be provided in plurality in the antenna array of FIGS. 1 and 3.
Figure 5:
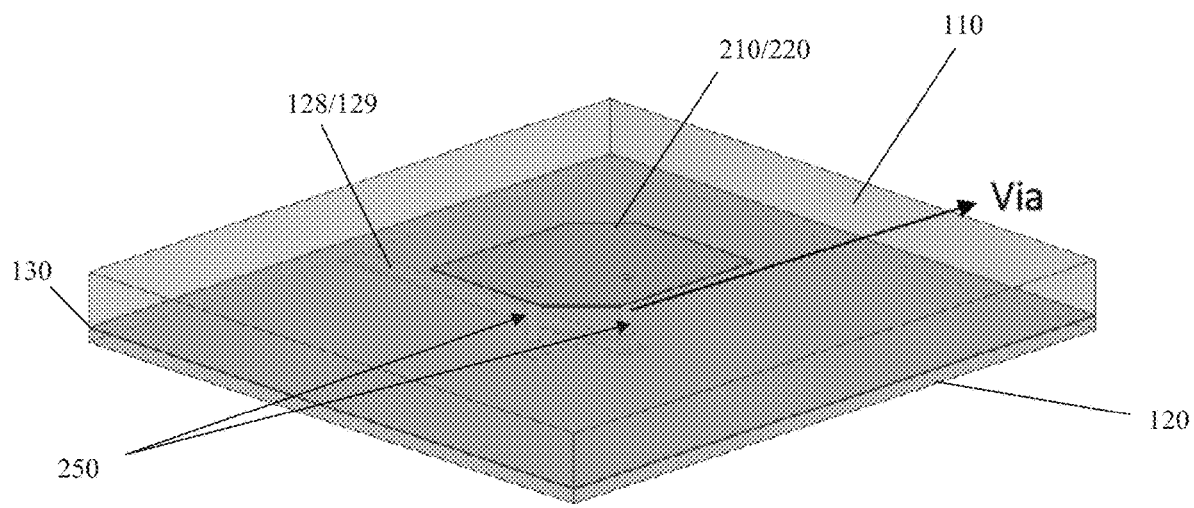
FIG. 5 shows a 3 D view of the dual band unit antenna of FIG. 4, including the substrate on which it is disposed.
Figure 6:
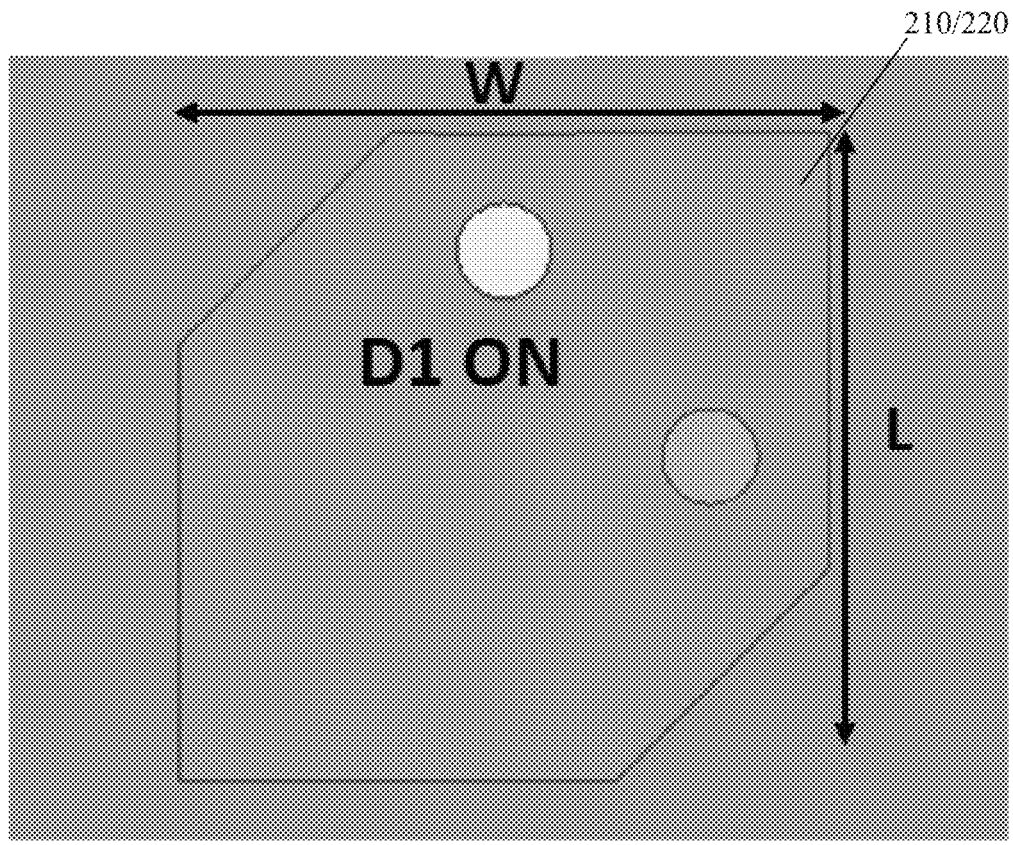
FIG. 6 shows a representation of a left-hand circular polarized (LHCP) configuration with an equivalent diode (D1) state for feeding of the unit antenna.
Figure 6:
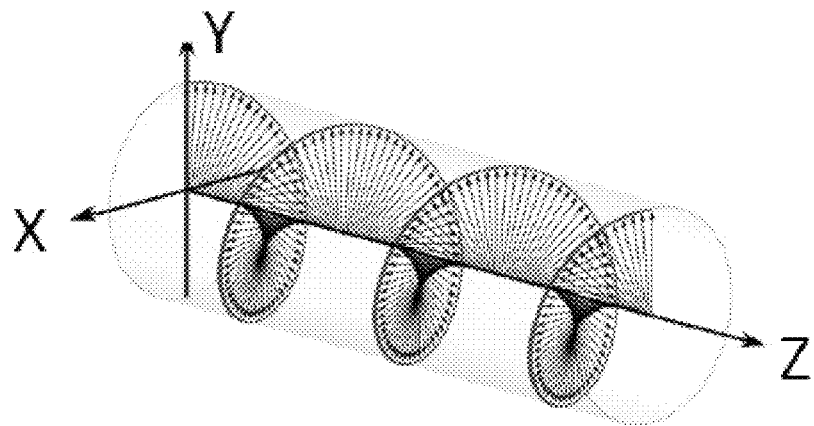
Figure 7:
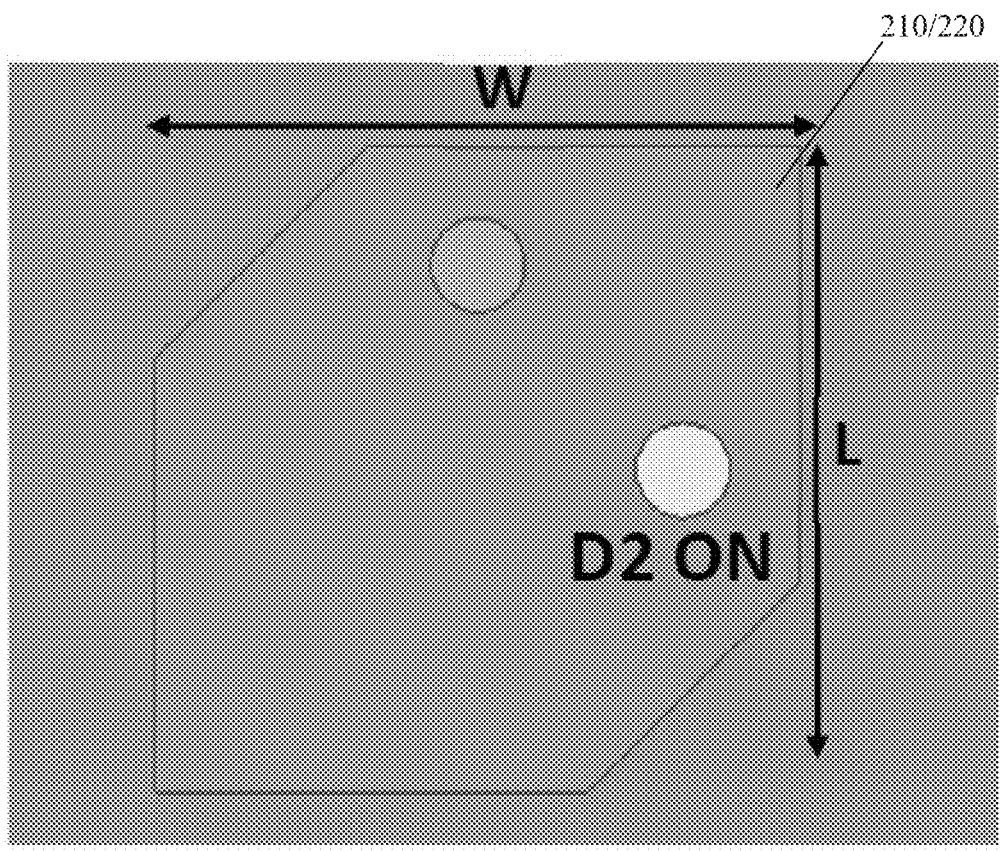
FIG. 7 shows a representation of a right-hand circular polarized (RHCP) configuration with an equivalent diode (D2) state for feeding of the unit antenna.
Figure 7:
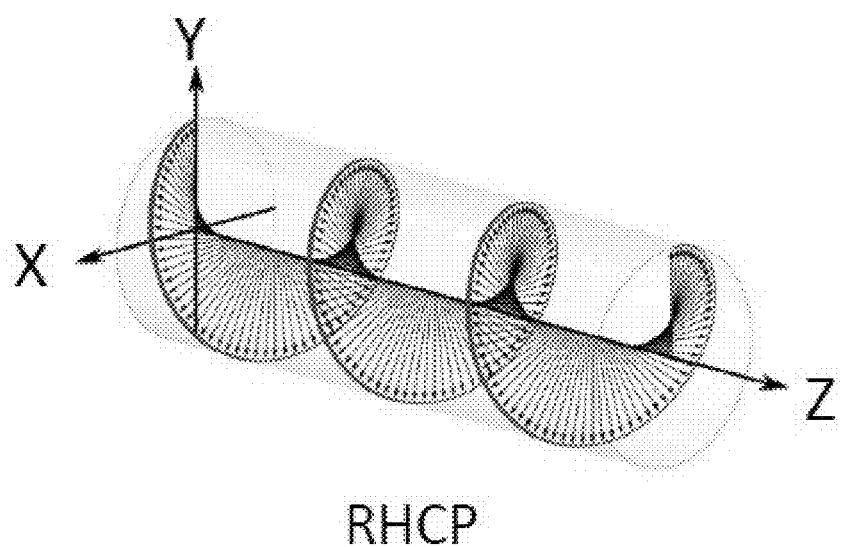

FIG. 1 shows a three-dimensional (3 D) exploded view of an antenna array, according to an embodiment of the subject invention. FIG. 2 shows a side view of the top substrate of the antenna array; FIG. 3 shows a top view of the antenna array; FIG. 4 shows a top view of a dual band unit antenna (i.e., a single radiating antenna element); and FIG. 5 shows a 3 D view of the dual band unit antenna, including a portion of the top substrate. Referring to FIGS. 1-5, an antenna system 100 (which can also be referred to herein as an antenna array or an antenna) can include radiating antenna elements 210 for L-band operation in a first array (e.g., a 2×4 array) of antenna elements 210, and the radiating antenna elements 220 for Ka-band operation can include a second array (e.g., a 1×16 array) of antenna elements 220 physically spaced apart on the top substrate 110 from the first array. The first array and the second array can share the same aperture in a compact planar structure. The first feed network 129 and the second feed network 128 can each be a microstrip transmission (Tx) line-based feed network, such as a microstrip transmission line-based parallel feed network. The first feed network 129 can be, for example, a one-to-2-way uniform feeding network for the L-band array of antenna elements 210; and the second feed network 128 can be, for example, a one-to-16-way uniform feeding network for the Ka-band array of antenna elements 220. The first feed network 129 can have a first feed connection line 124 for connecting to a power source, and the second feed network 128 can have a second feed connection line 123 for connecting to a (same or different) power source.

Each antenna element 210/220 for both the L-band array and the Ka-band array can be configured to achieve circular polarization (e.g., both LHCP and RHCP). Each antenna element 210/220 for both the L-band array and the Ka-band array can be, for example, a patch antenna. In certain embodiments, each antenna element 210/220 for both the L-band array and the Ka-band array can be a corner-truncated patch antenna having two corner portions 237 opposite from each other truncated off the patch (see, e.g., FIG. 4). The radiating antenna elements for the L-band array can be larger than those for the Ka-band array; the area of the top surface of each radiating antenna element for the L-band array can be, for example, at least 2 times larger (or at least 2.5 times larger, at least 3 times larger, at least 3.5 times larger, at least 4 times larger, at least 4.5 times larger, at least 5 times larger, or in a range of from 2 times larger to 10 times larger (or any value or subrange therewithin)) than the area of the top surface of each radiating antenna element for the Ka-band array.

In an embodiment, the top substrate 110, the ground plane 130, the bottom substrate 120, the feeding networks 128, 129, and the radiating antenna elements 210,220 comply with the spacing requirement for 3 U CubeSat (L×W×H=30 centimeters (cm)×10 cm×10 cm).

Figure 12:
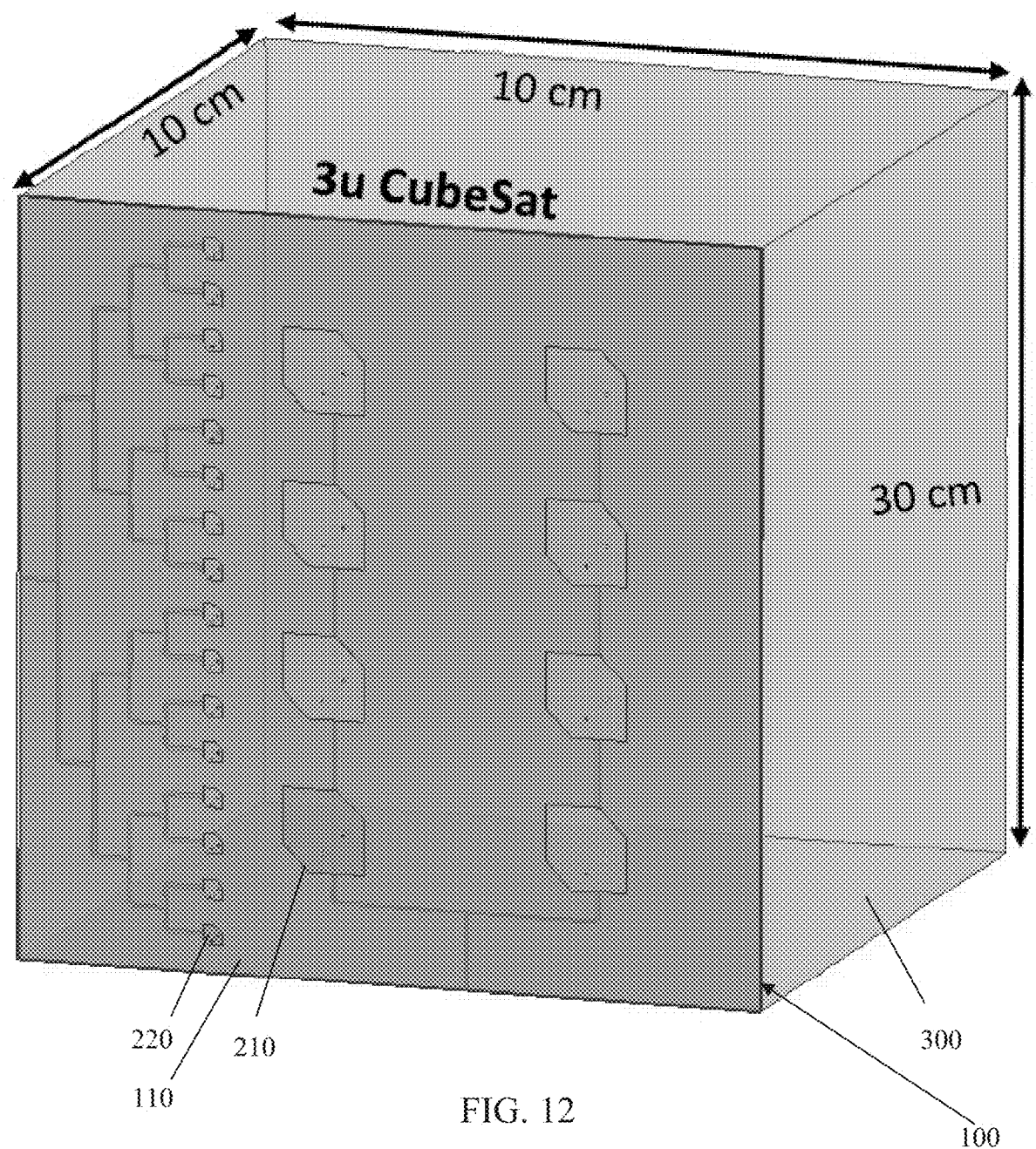
FIG. 12 shows a view of a polarization reconfigurable antenna, according to an embodiment of the subject invention, integrated with a 3 U CubeSat. Though FIG. 12 lists certain dimensions, these are for exemplary purposes only and should not be construed as limiting.

Each radiating antenna element 210,220 can be disposed over and in direct physical contact with two vias 250 (each or both which may be orthogonal to the upper surface of the top substrate 110). The two vias 250 connect with the respective feed network 129,128 (i.e., the two vias 250 can be in direct physical contact with the feed network 129,128). Each output feedline 122,121 of each feeding network 129,128 can include two diodes (D1,D2) (e.g., PIN diodes). Using ON/OFF states of the diodes D1,D2, the corresponding via 250 can be energized or de-energized and the polarization of the antenna in each band can be tuned. For example, for a given radiating antenna element 210,220, a first diode D1 may be energized while a second diode D2 is de-energized, leading to LHCP of the respective radiating antenna element 210,220; or the first diode D1 may be de-energized while the second diode D2 is energized, leading to RHCP of the respective radiating antenna element 210,220. FIG. 12 shows a view of a polarization reconfigurable antenna, according to an embodiment of the subject invention, integrated with a 3 U CubeSat. The 3 U CubeSat can include a base 300, which can make up the required thickness not provided by the low-profile antenna, in order to get to the standard 3 U CubeSat height of 10 cm (or about 10 cm). The antenna 100 and the base 300 can each have a length of 30 cm (or about 30 cm) and a width of 10 cm (or about 10 cm), giving the standard 3 U CubeSat dimensions of 30 cm×10 cm×10 cm (L×W×H).

Embodiment of the subject invention provide embedded antenna (or AIA) systems with full polarization diversity. Such antenna systems can be used for, e.g., 3 U CubeSats. The antenna system can include two arrays (one for L-band operation and one for Ka-band operation) on a single multifunctional platform that has a low profile (i.e., the height of the system, including all layers and antenna elements can be less than 10% (or less than 5%, or even less than 2%) of both the length and the width of the system). Using individual arrays for each band allows for optimization of the respective arrays for their designated frequency, hence maximizing the gain. Simultaneously, the inclusion of multiple apertures with full polarization diversity within the arrays allows for on-demand frequency variation and significantly improves transmission and reception for CubeSats. In addition, switching between the RHCP and LHCP can enhance the performance of the communication link by increasing polarization efficiency.

Embodiments of the subject invention provide antenna arrays that can be used both for LHCP and RHCP in L-band and Ka-band simultaneously. Such antenna arrays can be used for modern CubeS at communication. Embodiments of the subject invention provide two degrees of freedom in the form of simultaneous operation in both L-band and Ka-band, as well as polarization switching between LHCP and RHCP (within each band).

When ranges are used herein, combinations and subcombinations of ranges (e.g., any subrange within the disclosed range) and specific embodiments therein are intended to be explicitly included. When the term "about" is used herein, in conjunction with a numerical value, it is understood that the value can be in a range of 95% of the value to 105% of the value, i.e. the value can be +/−5% of the stated value. For example, "about 1 kg" means from 0.95 kg to 1.05 kg.

A greater understanding of the embodiments of the subject invention and of their many advantages may be had from the following examples, given by way of illustration. The following examples are illustrative of some of the methods, applications, embodiments, and variants of the present invention. They are, of course, not to be considered as limiting the invention. Numerous changes and modifications can be made with respect to embodiments of the invention.

EXAMPLE 1

Figure 8:
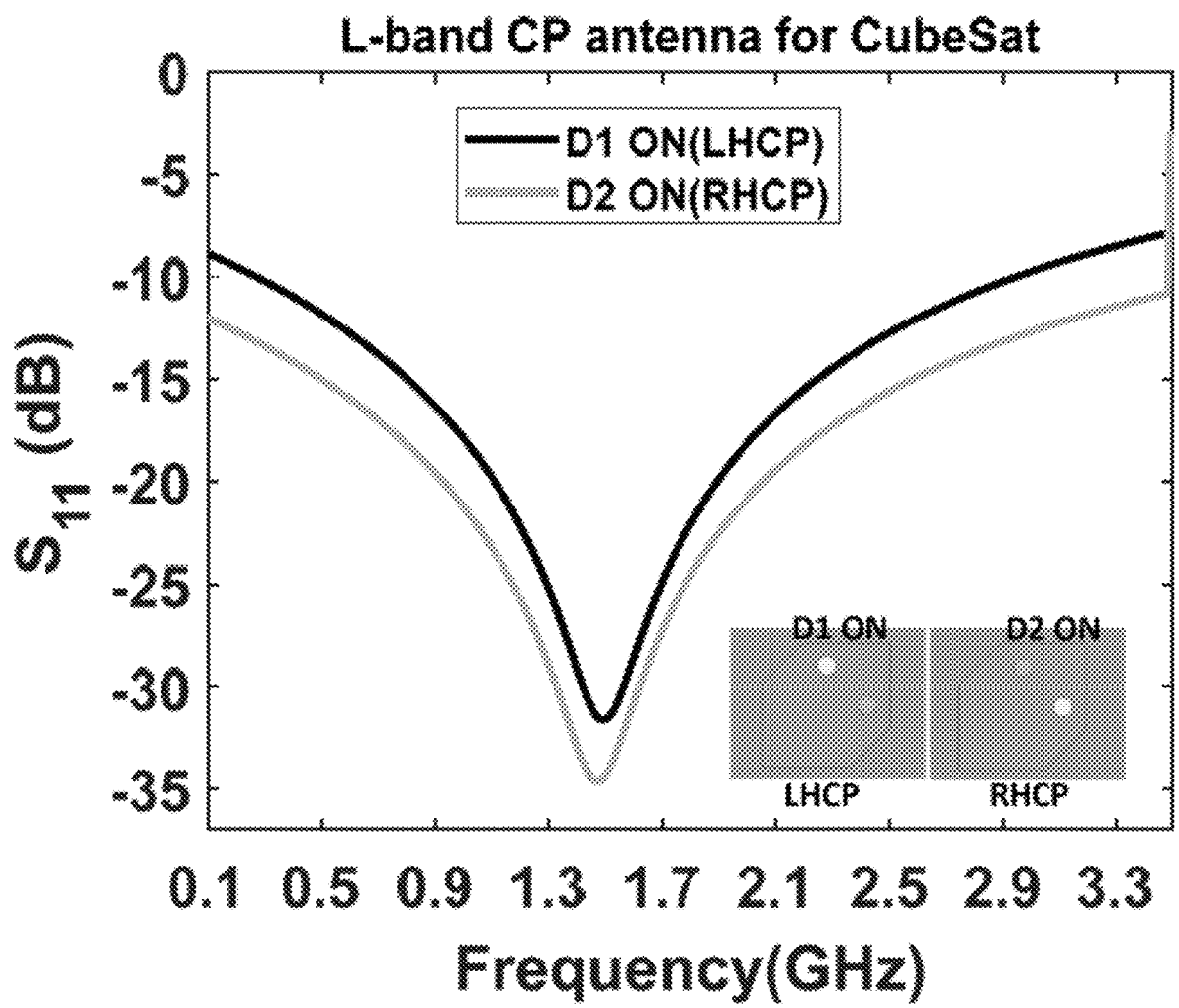
Figure 9:
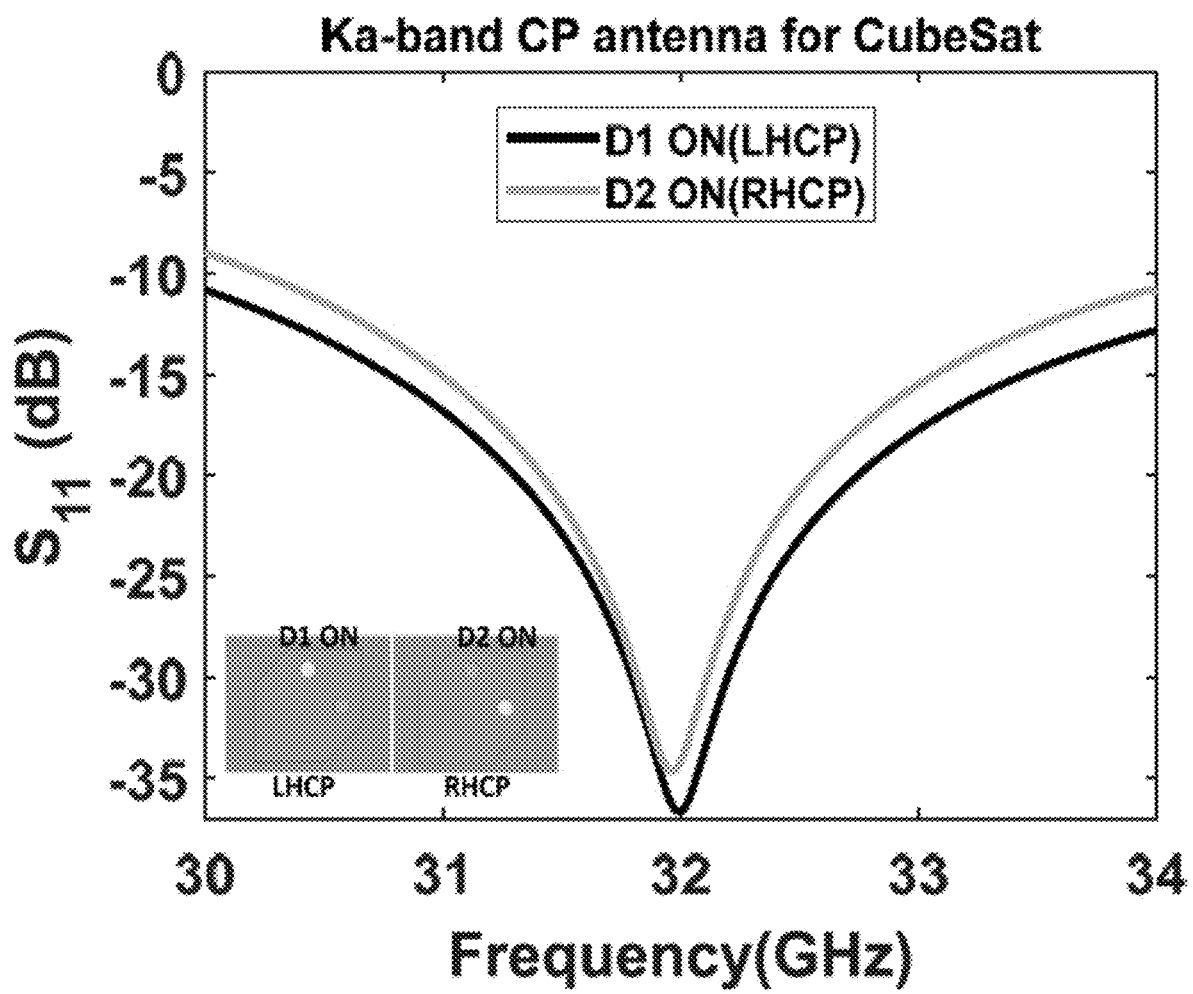
Figure 10:
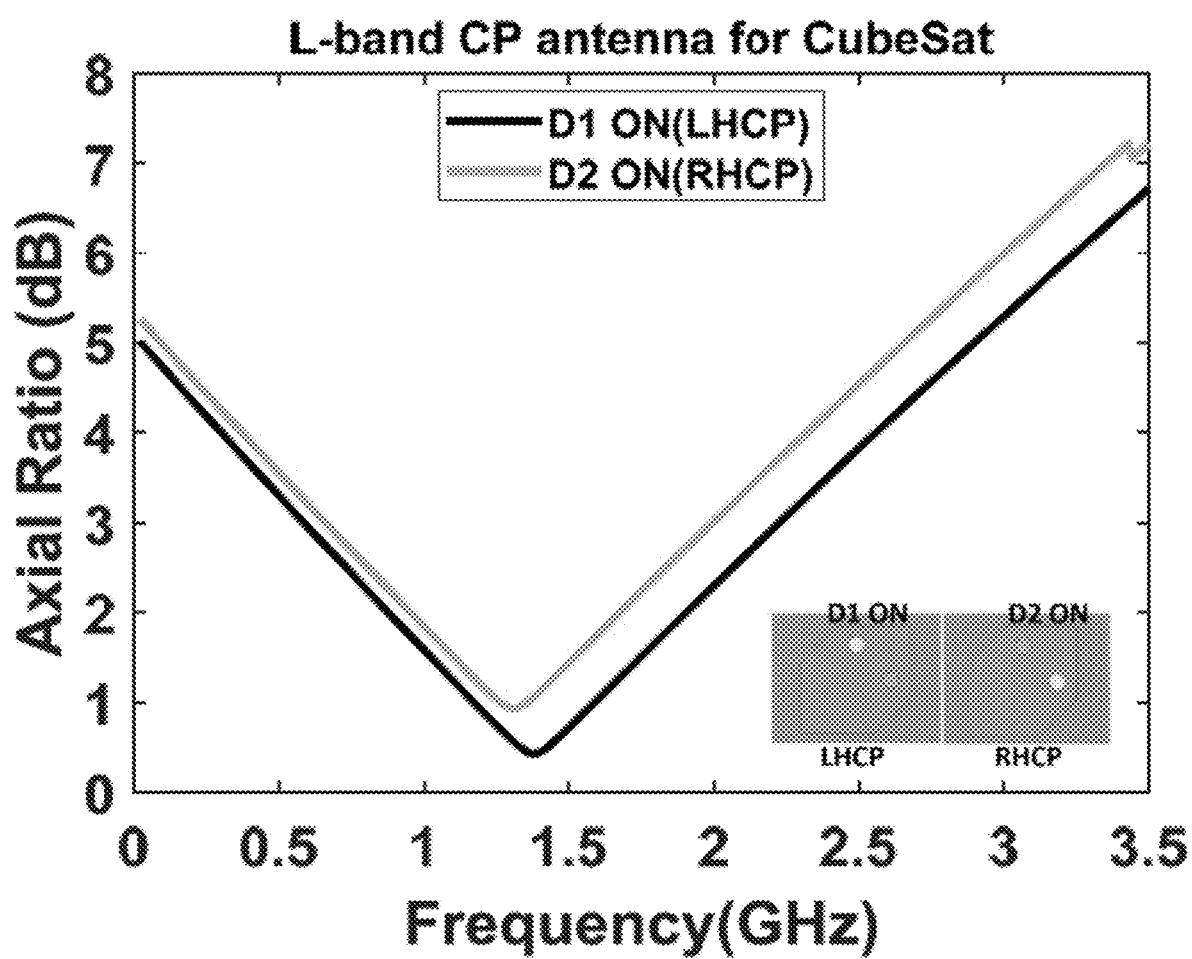
Figure 11:
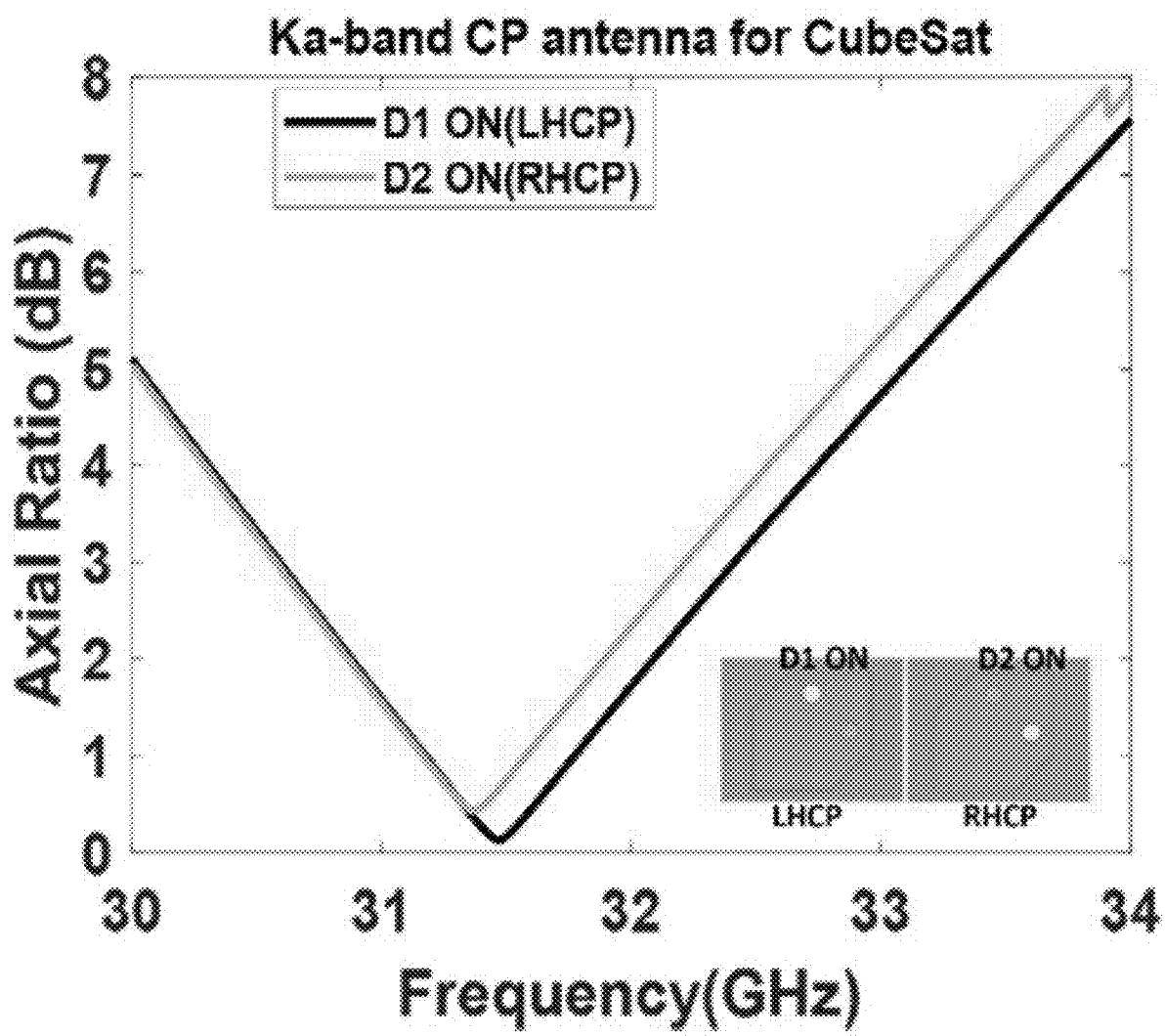

A full-wave simulation was performed using ANSYS High Frequency Structure Simulator (HFSS). First, a single antenna element for L-band operation and a single antenna element for Ka-band operation, both capable of providing both LHCP and RHCP, as shown in FIGS. 4-7, were simulated. The dimensions (L×W) of the antenna elements were 2.74 mm×2.74 mm for the Ka-band antenna element and 12 mm×12 mm for the L-band antenna element. FIGS. 8 and 9 show the $S_{11}$ of the L-band antenna element and the Ka-band antenna element, respectively. Each antenna element resonated near its operating frequency at Ka-band (32.3 GHz-34.2 GHz) and L-band (1.215 GHz-1.85 GHz). FIGS. 10 and 11 show the axial ratio of the L-band antenna element and the Ka-band antenna element, respectively. The axial ratio is below 3 decibels (dB) for both polarizations (LHCP and RHCP) of both the L-band antenna element and the Ka-band antenna element. These results verify the polarization reconfigurability of the antenna elements.

In the array shown in FIGS. 1-3, the expected gain for the L-band radiating antenna elements is about 15 dB as there are eight elements in the array, and the expected gain for the Ka-band radiating antenna elements is about 20 dB as there are 16 elements in the array.

EXAMPLE 2

Figure 13:
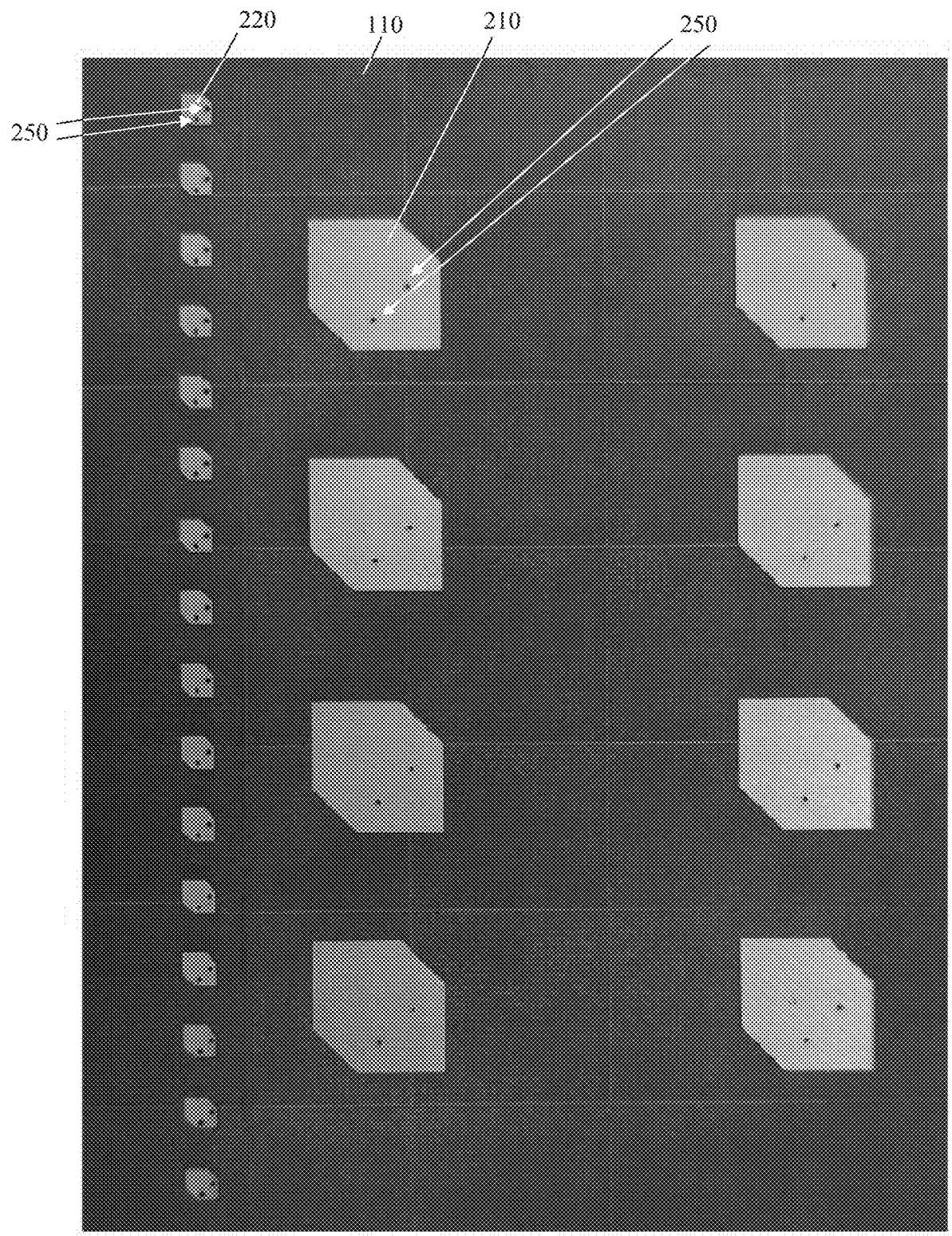
FIG. 13 shows an image of a top view of an antenna array, according to an embodiment of the subject invention.
Figure 14:
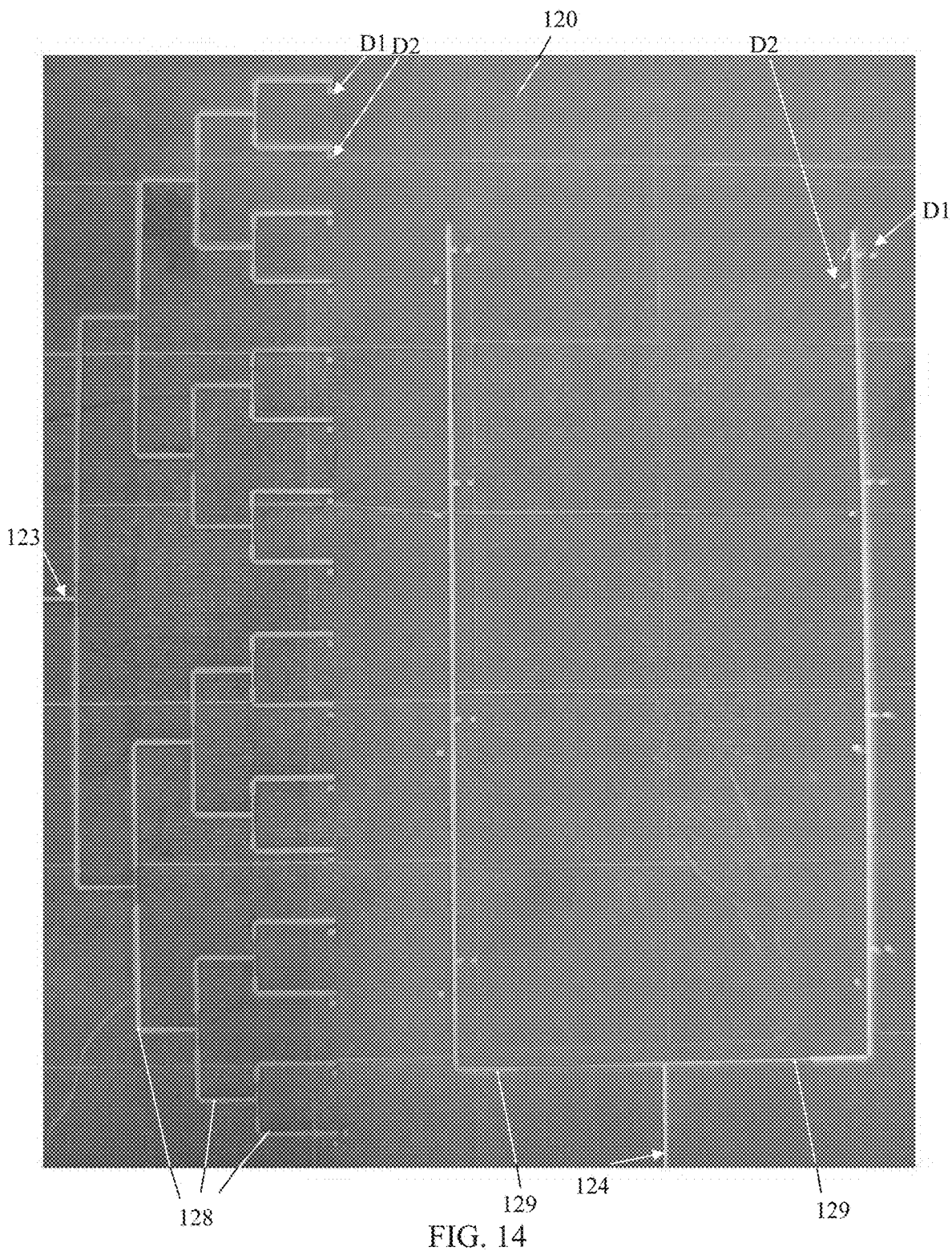
FIG. 14 shows an image of a bottom view of the antenna array from FIG. 13.

An antenna array as shown in FIGS. 1-3 was fabricated. FIG. 13 shows an image of an upper surface of the top substrate 110, including the L-band radiating antenna elements 210 and the Ka-band radiating antenna elements 220. FIG. 14 shows an image of a lower surface of the bottom substrate 120, including the feed network 129 for the L-band radiating antenna elements 210 and the feed network 128 for the Ka-band radiating antenna elements 220. FIG. 14 also shows the diodes D1,D2 present for each output feedline 122,121 of each feeding network 129,128, as well as the first feed connection line 124 and the second feed connection line 123.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. An antenna system, comprising:
   a top substrate;
   a bottom substrate;
   a ground plane disposed between the top substrate and the bottom substrate;
   a first array of first antenna elements disposed on the top substrate and configured to operate in the L-band;
   a second array of second antenna elements disposed on the top substrate and configured to operate in the Ka-band;
   a first feed network disposed on the bottom substrate and electrically connected to the first array; and
   a second feed network disposed on the bottom substrate and electrically connected to the second array,
   the first feed network comprising a plurality of first output feedlines respectively connected to the first antenna elements,
   the second feed network comprising a plurality of second output feedlines respectively connected to the second antenna elements,
   each first output feedline comprising two diodes,
   each second output feedline comprising two diodes, and
   the antenna system further comprising:
   a plurality of first via pairs respectively connecting the first antenna elements to the first output feedlines; and
   a plurality of second via pairs respectively connecting the second antenna elements to the second output feedlines,
   the two diodes of each first output feedline being in direct physical contact with two vias, respectively, of one of the first via pairs, and
   the two diodes of each second output feedline being in direct physical contact with two vias, respectively, of one of the second via pairs.

2. The antenna system according to claim 1, further comprising:
   a plurality of first via pairs respectively connecting the first antenna elements to the first output feedlines; and
   a plurality of second via pairs respectively connecting the second antenna elements to the second output feedlines.

3. The antenna system according to claim 1, the first feed network comprising a first feed connection line extending to a first portion of an outer perimeter of the bottom substrate, and
   the second feed network comprising a second feed connection line extending to a second portion of the outer perimeter of the bottom substrate.

4. The antenna system according to claim 1, the first array comprising eight first antenna elements disposed in a 2×4 arrangement.

5. The antenna system according to claim 4, the second array comprising sixteen second antenna elements disposed in a 1×16 arrangement.

6. The antenna system according to claim 1, the second array comprising sixteen second antenna elements disposed in a 1×16 arrangement.

7. The antenna system according to claim 1, each first antenna element being a patch antenna element, and
   each second antenna element being a patch element.

8. The antenna system according to claim 1, each first antenna element being a patch antenna element with two opposite corners each being truncated, and
   each second antenna element being a patch element with two opposite corners each being truncated.

9. The antenna system according to claim 1, each first antenna element having an upper surface with an area that is at least 2 times larger than an area of an upper surface of each second antenna element.

10. The antenna system according to claim 1, each first antenna element having an upper surface with an area that is at least 3 times larger than an area of an upper surface of each second antenna element.

11. The antenna system according to claim 1, each first antenna element having an upper surface with an area that is at least 4 times larger than an area of an upper surface of each second antenna element.

12. The antenna system according to claim 1, the first feed network being a microstrip transmission line-based network, and the second feed network being a microstrip transmission line-based network.

13. The antenna system according to claim 1, each first antenna element being configured to operate as both left-hand circular polarized (LHCP) and right-hand circular polarized (RHCP), and
each second antenna element being configured to operate as both LHCP and RHCP.

14. The antenna system according to claim 1, the antenna system configured to operate the first antenna array and the second antenna array simultaneously.

15. A 3 U CubeSat, comprising:
a base; and
the antenna system according to claim 1 disposed on the base,
the antenna system and the base each having a length of about 30 centimeters (cm) and a width of about 10 cm, and
the 3 U CubeSat having a height of about 10 cm.

16. An antenna system, comprising:
a top substrate;
a bottom substrate;
a ground plane disposed between the top substrate and the bottom substrate;
a first array of first antenna elements disposed on the top substrate and configured to operate in the L-band;
a second array of second antenna elements disposed on the top substrate and configured to operate in the Ka-band;
a first feed network disposed on the bottom substrate and electrically connected to the first array; and
a second feed network disposed on the bottom substrate and electrically connected to the second array,
the first feed network comprising a plurality of first output feedlines respectively connected to the first antenna elements,
the second feed network comprising a plurality of second output feedlines respectively connected to the second antenna elements,
the antenna system further comprising:
a plurality of first via pairs respectively connecting the first antenna elements to the first output feedlines; and
a plurality of second via pairs respectively connecting the second antenna elements to the second output feedlines,
each first output feedline comprising two diodes,
each second output feedline comprising two diodes,
the two diodes of each first output feedline being in direct physical contact with two vias, respectively, of one of the first via pairs,
the two diodes of each second output feedline being in direct physical contact with two vias, respectively, of one of the second via pairs,
the first feed network comprising a first feed connection line extending to a first portion of an outer perimeter of the bottom substrate,
the second feed network comprising a second feed connection line extending to a second portion of the outer perimeter of the bottom substrate,
the first array comprising eight first antenna elements disposed in a 2×4 arrangement,
the second array comprising sixteen second antenna elements disposed in a 1×16 arrangement,
each first antenna element being a patch antenna element with two opposite corners each being truncated,
each second antenna element being a patch element with two opposite corners each being truncated,
each first antenna element having an upper surface with an area that is at least 4 times larger than an area of an upper surface of each second antenna element,
the first feed network being a microstrip transmission line-based network,
the second feed network being a microstrip transmission line-based network,
each first antenna element being configured to operate as both left-hand circular polarized (LHCP) and right-hand circular polarized (RHCP),
each second antenna element being configured to operate as both LHCP and RHCP, and
the antenna system configured to operate the first antenna array and the second antenna array simultaneously.

17. A 3 U CubeSat, comprising:
a base; and
the antenna system according to claim 16 disposed on the base,
the antenna system and the base each having a length of about 30 centimeters (cm) and a width of about 10 cm, and
the 3 U CubeSat having a height of about 10 cm.

* * * * *